United States Patent
Stephan

(10) Patent No.: US 11,274,703 B2
(45) Date of Patent: Mar. 15, 2022

(54) ROLLED-ON-SURFACE ELEMENT OF A ROLLING-ELEMENT BEARING ASSEMBLY AND METHOD FOR REPAIRING A ROLLED-ON-SURFACE ELEMENT

(71) Applicant: AKTIEBOLAGET SKF, Gothenburg (SE)

(72) Inventor: Bernd Stephan, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 142 days.

(21) Appl. No.: 16/748,981

(22) Filed: Jan. 22, 2020

(65) Prior Publication Data
US 2020/0277991 A1 Sep. 3, 2020

(30) Foreign Application Priority Data
Mar. 1, 2019 (DE) .......................... 102019202840.3

(51) Int. Cl.
| | | |
|---|---|---|
| *F16C 33/58* | (2006.01) | |
| *F16C 33/64* | (2006.01) | |
| *B23P 15/00* | (2006.01) | |
| *B23P 6/00* | (2006.01) | |

(52) U.S. Cl.
CPC ................. *F16C 33/64* (2013.01); *B23P 6/00* (2013.01); *B23P 15/003* (2013.01); *F16C 33/585* (2013.01); *F16C 2237/00* (2013.01)

(58) Field of Classification Search
CPC .... F16C 33/585; F16C 33/64; F16C 2237/00; B23P 15/003
See application file for complete search history.

(56) References Cited

FOREIGN PATENT DOCUMENTS

DE 102019201442 A1 * 8/2020 ............ F16C 33/585

* cited by examiner

*Primary Examiner* — Phillip A Johnson
(74) *Attorney, Agent, or Firm* — J-Tek Law PLLC; Scott T. Wakeman; Mark A. Ussai

(57) ABSTRACT

A rolled-on-surface element of a rolling-element bearing assembly has a rolled-on surface configured to support a plurality of rolling elements, a cavity in the rolled-on surface having an opening smaller than 25% of a total area of the rolled-on surface, and an insert press-fit in the cavity such that an exposed surface of the insert forms a portion of the rolled-on surface. Also, a method of repairing a rolled-on surface of a rolled-on-surface element using an insert.

14 Claims, 1 Drawing Sheet

ROLLED-ON-SURFACE ELEMENT OF A ROLLING-ELEMENT BEARING ASSEMBLY AND METHOD FOR REPAIRING A ROLLED-ON-SURFACE ELEMENT

CROSS-REFERENCE

This application claims priority to German patent application no. 10 2019 202 840.3 filed on Mar. 1, 2019, the contents of which are fully incorporated herein by reference.

TECHNOLOGICAL FIELD

The disclosure is directed to a rolled-on-surface element of a rolling-element bearing assembly and a method for repairing a rolled-on-surface element.

BACKGROUND

The time required for a rolling-element bearing to reach the end of its service life depends on the loads experienced by the rolling-element bearing during operation. When rolling-element bearings are monitored by state-detecting sensors, the impending end, for example, due to imminent damage, can be predicted. A rolling-element bearing without such sensors may operated until damage occurs or up to the end of a calculated service life. At that time, the complete rolling-element bearing is usually replaced by a new rolling-element bearing.

SUMMARY

It is an aspect of the disclosure to provide a rolled-on-surface element of a rolling-element bearing assembly and a method for repairing a rolled-on-surface element such that the service life is extended.

Here the disclosure is based inter alia on the recognition that replacing a worn rolling-element bearing with a new, complete rolling-element bearing is not very sustainable, in particular with large and expensive rolling-element bearings, and in many cases also absolutely unnecessary, but rather a repair as such is possible.

A rolling-element bearing usually comprises an outer rolled-on-surface element that is often configured as a bearing outer ring, an inner rolled-on-surface element that is often configured as a bearing inner ring, and at least one row of rolling elements that are provided for rolling on the rolled-on races of the inner and outer rolled-on-surface elements and are correspondingly disposed between the two elements. Here the rolling elements can be disposed in a cage that prevents the rolling elements from contacting each other. Furthermore the space containing the rolling elements can be sealed between the outer and inner rolled-on-surface element by, for example, sealing or covering discs disposed on the outer rolled-on-surface element, wherein a lubricant, for example, a lubricating grease, can be present in this space. Typically the outer and inner rolled-on-surface element are made from a steel, in particular a hardened rolling-element bearing steel; wherein it can of course also be a case-hardened steel. The same applies to the rolling elements, wherein these can also be formed from a ceramic material. The cage is configured one- or multi-part, typically from a metal, in particular steel or brass, or a plastic.

The method here comprises the following steps. First the rolling-element bearing that may be repaired is removed from its installation environment and disassembled at least enough that the rolled-on races of the bearing inner and/or bearing outer ring are freely accessible. Here at least the rolled-on race and also regions of contaminants and also lubricants adhering there, which regions are adjacent to the rolled-on race, are to be cleaned. Possibly damaged or no-longer-serviceable rolled-on regions are then identified. This can start with using a purely visual inspection in order to then find signs of damage, for example, regions of the rolled-on race exhibiting crack formation or cracks, optionally using ultrasound-, stray-current-, and/or other suitable test methods.

After rolled-on race regions exhibiting signs of damage have been found using the above mentioned test, a repair is only considered if in particular one or a few individual spatially connected regions are present constituting only parts of the rolled-on race. For example a repair is possible in particular when the damage region is delimitable on the rolled-on race by a single circular region. Large crack networks, for example, cannot be repaired, and the bearing ring is to be replaced by a new one.

However, if a repairable, for example, circularly delimitable region is present, then a circular-cylindrical cavity is worked out in this circular region in the rolled-on race down to a depth of a few millimeters, for example, down to a depth of 5 to 10 mm. This working-out can be effected here, for example, using a mobile, CNC-controlled milling and/or grinding machine. Alternatively of course a spark-erosion machine and/or any other material ablation method can be used. Here the diameter of the cavity is selected based in particular on a permanently fixed diameter gradation, for example, in steps of 10 mm, which allows with particular advantage the use of correspondingly prefabricated inserts, that is, so to speak, the use of standard inserts. Here the inserts are formed from the same material or a material exhibiting identical or similar properties as the bearing ring. Here the diameter of the insert and cavity are formed with respect to each other at the same temperature with a definable fit, in particular a definable press-fit.

The selected insert is then provided with a heat-conducting paste on the side that is provided for abutting against the base of the cavity. Here the heat conducting paste shall in particular improve the contact between the insert and the base of the cavity in order to dissipate heat from the rolling contact in the region of the insert in the bearing ring during later rolling-element bearing operation. In other embodiments the heat-conducting paste can also be omitted.

The insert is then greatly cooled down. This cooling down can be effected, for example, with the aid of liquid nitrogen that has a temperature of −196° C. Of course the cooling down can also be effected with the aid of other media and/or other suitable methods. Simultaneously the bearing ring to be repaired is heated at least in the region of the cavity. This can be effected using an inductive heater and/or using any other suitable heating device and/or method. Finally the cooling down and heating have to be effected in a manner adapted to each other such that with press-fit-type diameter design of insert and cavity with respect to each other the circular-disc insert is insertable into the circular-cylindrical cavity of the race ring. The cooled-down insert is finally inserted into the heated cavity of the bearing ring and pressed-on with a defined pressure.

Since, compared to the rolled-on race region surrounding it, the insert is configured with respect to its height such that the insert used projects over the rolled-on race regions surrounding it, after the temperature equalization between insert and bearing ring the original rolled-on race is remanufactured by processing the insert in a corresponding material-ablating manner by milling, grinding, and/or honing.

For this purpose a mobile, CNC-controlled milling, grinding, and/or honing machine can be used in turn.

The bearing ring is then cleaned and the rolling-element bearing is reassembled with the repaired bearing ring and optionally provided with fresh lubricant. The repaired rolling-element bearing is then installed again in its installation environment. If the rolling-element bearing is not already provided with state-detecting sensors, the rolling-element bearing or its installation environment should be equipped with such state-detecting sensors—if only temporarily—in order to verify a flawless repair result at least during a test run in the installation environment. This can be effected, for example, based on an evaluation of the vibrations captured by the state-detecting sensors, vibrations, temperatures, and/or the like. Of course alternatively and/or in addition such a test run can also occur outside the intended installation environment of the rolling-element bearing.

Alternatively the cavity can also be formed as a penetration penetrating the rolled-on-surface element, in particular truncated-cone-shaped, wherein then of course the insert is also to be configured correspondingly truncated-cone-shaped.

Alternatively the cross-sectional surface of the insert and of the cavity need not be circular, but rather can also be oval or polygonal, rectangular, and square, wherein of course with rectangular and/or square design the rectangle- or square-lateral-lines should not be oriented perpendicular to the rolling-on direction, in particular with roller bearings.

Further advantages, features and details of the disclosure result from the exemplary embodiments of the disclosure described in the following with the assistance of the Figures.

DETAILED DESCRIPTION

Figure 1:
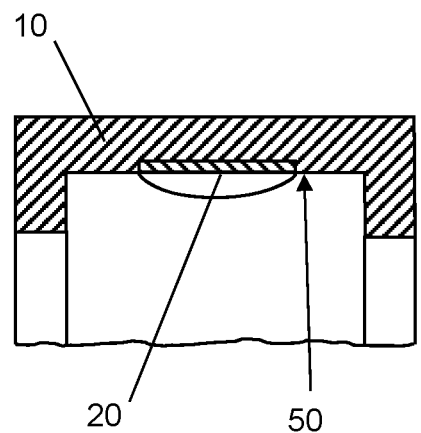
FIG. 1 is an upper region of a longitudinal section of a repaired cylindrical-roller bearing outer ring according to a first embodiment.

FIG. 1 shows as a first exemplary embodiment of the invention an upper region of a longitudinal section of a repaired cylindrical-roller-bearing outer ring 10. Here after there was at least a suspicion of damage that has been indicated, for example, by correspondingly present state-detecting sensors, the cylindrical roller bearing associated with the unrepaired cylindrical-roller-bearing outer ring 10 is removed from its operating environment, disassembled, and at least the cylindrical-roller-bearing outer ring 10 is cleaned. Here it is a large cylindrical roller bearing having an inner diameter of 450 mm. Here in particular large rolling-element bearings represent a not-insignificant investment amount, whereby a repair is more worthwhile the larger and thus more expensive the rolling-element bearing is. Here the cylindrical-roller-bearing outer ring 10 is formed from a through-hardened 100C6 rolling-element bearing steel.

Thereafter an ultrasonic examination of the rolled-on race 50 of the removed and cleaned cylindrical-roller-bearing outer ring 10 showed that cracks are emerging at a single, limited circumferential location. A circular-cylindrical cavity was then ground out in this region using a mobile grinding machine. Here the selected depth of the cavity encompassed the areas where the cracks appeared and was 7 mm. The diameter of the cavity comprising all crack networks was chosen here as the next full centimeter, in the present case 12 cm, so that it was possible to use an insert 20, that was singled out among prefabricated inserts that are prefabricated in diameter to full centimeters and in height in 1 mm steps, wherein the inserts are formed from through-hardened 100Cr6 rolling-element bearing steel. Here cavity and insert 20 are adapted to each other in diameter in a press-fit manner. Here the height of the insert 20 was selected such that after the insertion the insert 20 initially projects over the rolled-on race 50 surrounding it.

The selected insert 20 was then coated with a heat-conducting paste on its end surface provided for contacting the cavity base, and cooled down using liquid nitrogen, wherein simultaneously the cylindrical-roller bearing outer ring 10 was heated with an inductor. The cooled-down insert 20 was thereby insertable into the heated cavity with low forces. The intended press-fit-type fixing of the insert 20 in the cavity is only set after the subsequent temperature equalization between insert 20 and cylindrical-roller-bearing outer ring 10.

Thereafter to remanufacture the original rolled-on race 50, the projecting regions of the insert 20 were ground away and honed with a mobile grinding and honing machine. Thus the repaired cylindrical-roller-bearing outer ring 10 shown in FIG. 1 is present. This can then be installed again with the remaining bearing parts for the cylindrical roller bearing and regreased. Optionally another check of the repair result can subsequently take place as described above.

Figure 2:
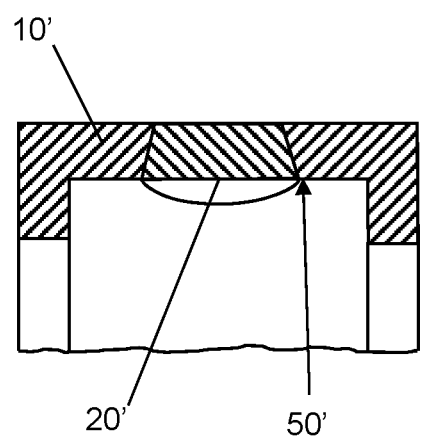
FIG. 2 is an upper region of a longitudinal section of a repaired cylindrical-roller bearing outer ring according to a second embodiment.

FIG. 2 shows as a second exemplary embodiment of the invention an upper region of a longitudinal section of a repaired cylindrical-roller-bearing outer ring 10'. Here the cylindrical-roller-bearing outer ring 10' of FIG. 2 differs from that of FIG. 1 only in that in FIG. 2 the cavity is configured as a truncated-cone-shaped cavity radially penetrating the cylindrical-roller-bearing outer ring 10', and the insert 20' is also configured in a corresponding truncated-cone-shaped manner. Thus it is clear that with repair methods for the cylindrical-roller-bearing outer ring 10' of FIG. 2 there is no heat-conducting coating on an end side of the insert 20', and optionally in addition a post-processing is necessary of the end side of the insert 20' contributing to form the outer surface of the cylindrical-roller-bearing outer ring 10'. Otherwise the preceding description for FIG. 1 is correspondingly valid for FIG. 2. Accordingly in FIG. 2 identical elements are designated with the same reference numbers as in FIG. 1, supplemented with an apostrophe.

Alternatively in FIG. 2 the cavity and the insert can also be configured rotated, so to speak, 180° about their horizontal center axis, so that the larger-diameter end of the truncated cone abuts radially outward, i.e., against the outer surface of the cylindrical-roller-bearing outer ring and the smaller-diameter end abuts radially inward against the rolled-on race. Thus the particular advantage is related that the insert cannot fall radially inward out of the cavity; wherein the insert is also secured toward the opposite direction at the latest after a full installation of the cylindrical-roller-bearing outer ring in its installation environment.

Of course the preceding description can be used the same way with other roller bearings, i.e., for example, with tapered and spherical roller bearings, but of course also with ball bearings.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rolled-on-surfaces of rolling element bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A rolled-on-surface element of a rolling-element bearing assembly, comprising:
   a rolled-on surface configured to support a plurality of rolling elements;
   a cavity in the rolled-on surface having an opening smaller than 25% of a total area of the rolled-on surface; and
   an insert press-fit in the cavity such that an exposed surface of the insert forms a portion of the rolled-on surface.

2. The rolled-on-surface element according to claim 1, wherein the cavity is circular-cylindrical, and the insert is circular in cross section.

3. The rolled-on-surface element according to claim 1,
   wherein the cavity is a through opening through the rolled-on surface element,
   wherein the insert has a shape of a truncated cone having a first end larger than a second end, and
   wherein the second end forms the portion of the rolled-on surface.

4. The rolled-on-surface element according to claim 1, wherein the rolled-on-surface element is the inner ring or the outer ring of a roller bearing.

5. The rolled-on-surface element according to claim 1, wherein the roller bearing has an inner diameter greater than or equal to 400 mm.

6. The rolled-on-surface element according to claim 1, wherein the insert has physical characteristics substantially similar to physical characteristics of the rolled-on surface element.

7. The rolled-on-surface element according to claim 1, including a layer of heat conducting paste on a surface of the insert opposite the exposed surface.

8. A method for repairing a rolled-on-surface element of a rolling-element bearing assembly, the rolled-on-surface element comprises a rolled-on surface configured to support rolling elements of the rolling element bearing, the method comprising:
   identifying a damaged region of the rolled-on surface,
   removing the damaged region by creating a cavity in the rolled-on surface element,
   press-fitting an insert into the cavity such that the insert projects beyond a portion of the rolled-on surface that surrounds the cavity, and
   removing the projecting portion of the insert.

9. The method according to claim 8, including, before press-fitting the insert into the cavity,
   cooling the insert; and
   heating the portion of the rolled-on surface.

10. The method according to claim 8, including, before press-fitting the insert into the cavity,
    cooling the insert using liquid nitrogen; and
    inductively heating the portion of the rolled-on surface.

11. The method according to claim 10, wherein prior to the press-fitting, coating a surface of the insert with a heat-conducting paste.

12. The method according to claim 8, wherein prior to the press-fitting, coating a surface of the insert with a heat-conducting paste.

13. The method according to claim 8, wherein
    prior to the identifying, removing the rolled-on surface element from an installation location and at least partially disassembling the rolling-element bearing and cleaning the rolled-on surface,
    the identifying comprises an ultrasound or stray-current inspection,
    removing the damaged portion comprises a CNC-controlled milling or a grinding or a spark-erosion process,
    removing the projecting portion comprises the CNC-controlled milling or the grinding or the spark-erosion process, and
    reassembling and relubricating the rolling-element bearing.

14. The method according to claim 8, wherein the cavity is cylindrical.

* * * * *